April 22, 1930.  E. EATON  1,755,776
OIL TIGHT TRANSMISSION GEAR HEAD
Filed April 29, 1927
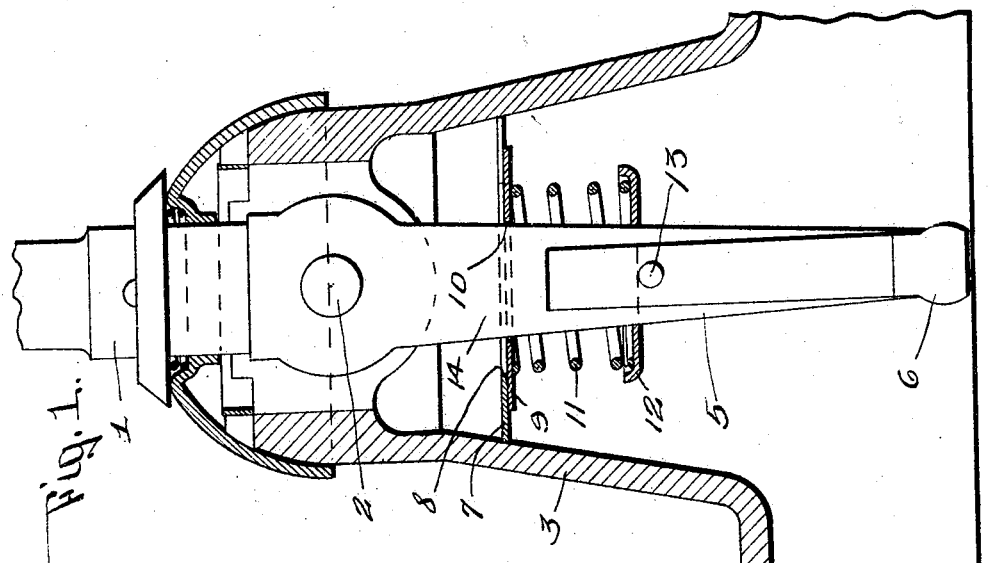
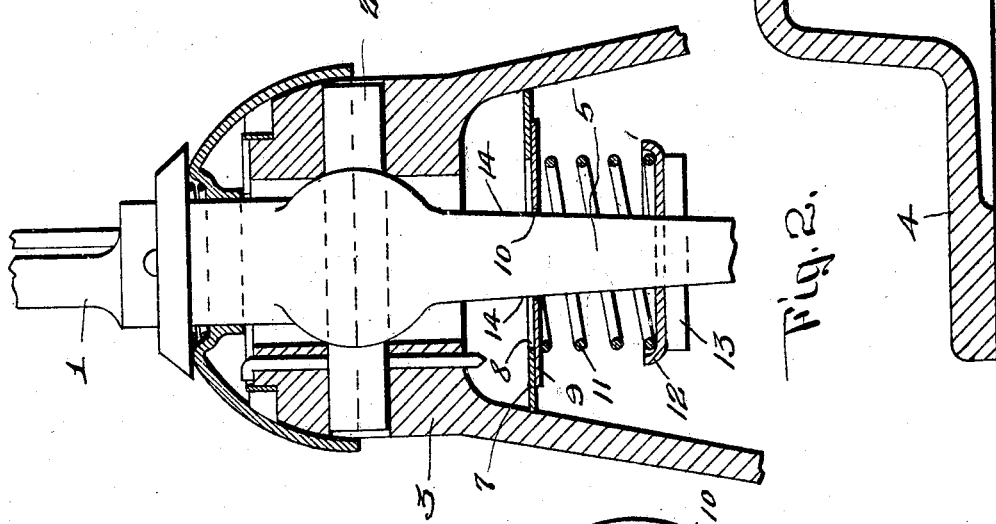
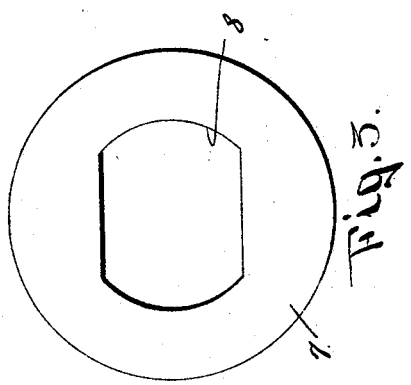
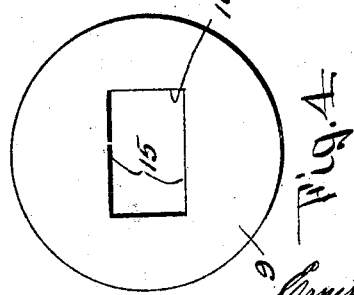
INVENTOR.
Ernest Eaton
BY
Parsons & Bodell
ATTORNEYS.

Patented Apr. 22, 1930

1,755,776

UNITED STATES PATENT OFFICE

ERNEST EATON, OF SYRACUSE, NEW YORK, ASSIGNOR TO BROWN-LIPE GEAR COMPANY, OF SYRACUSE, NEW YORK, A CORPORATION OF NEW YORK

OIL-TIGHT TRANSMISSION-GEAR HEAD

Application filed April 29, 1927. Serial No. 187,638.

This invention has for its object a particularly simple, efficient and economical means for preventing the oil from the casing of the transmission gearing from creeping up along the shifting lever and the housing therefrom to the outside of the housing or cover or head of the gear casing.

The invention consists in the novel features and in the combinations and constructions hereinafter set forth and described. In describing this invention reference is had to the accompanying drawings in which like characters correspond in all the views.

Figure 1 is a vertical sectional view of the cover or head of a transmission gear casing embodied in my invention.

Figure 2 is a fragmentary vertical sectional view taken to a right angle of view 1.

Figures 3 and 4 are detail views of the cover and closure plates.

As will be understood by those skilled in the art, the gear shifting lever of the usual transmission gearing used in motor vehicles is carried by the head or cover of the transmission gear casing and this head or cover includes the upwardly extending tubular portion or housing in the open end of which the gear shifting member is pivoted, the lower or shifting arm depending downwardly through the tubular housing into position to selectively engage with the shifting rods. The gear shifting lever has the usual lateral or selecting movements and the fore and aft shifting movements.

As will be understood by those skilled in the art, the gear casing is filled with lubricant and during the rotation of the gears this is thrown into the head and on the lever and creeps up along the lever and the housing to the passage at the top of the housing through which the lever extends.

This invention comprises means for preventing such oil from creeping upwardly along the housing and the gear shifting lever.

The gear shifting lever and the housing may be of any suitable form, size or construction. The numeral 1 designates the lever which is pivoted at 2 in the upper end of a tubular housing 3 extending upwardly from the head of cover 4 of the gear casing, the lever being mounted to have the usual selecting movements.

5 is the lower or shifting arm of the lever 1. This depends downwardly through the housing 3 into position in which its lower end 6 can have a selecting and shifting engagement with the shifter rods of the gearing not shown. The housing 3 is usually slightly tapered upwardly from its lower end toward its upper end to provide for the selecting and shifting swinging movements of the lever arm 5.

The means for preventing the creeping of the oil along the shifting lever comprises a transverse partition in the housing having an enlarged opening therein, sufficient to accommodate the lateral selecting and the fore and aft shifting movements of the lever arm 5, a closure in the form of the slide for the enlarged opening in the partition the closure being mounted on the lever arm 5 and means for holding it engaged with the partition. The partition closure and associated parts are preferably a self contained structure with the lever arm 5, that is, they require no attachment to the housing and as here shown the partition consists of a sheet metal plate 7 snugly fitting the interior wall of the housing 3 and having an enlarged opening 8 and the closure 9 having an opening 10 therein which substantially fits the lever arm 5, the plate sliding on the lower side of the partition plate 7.

11 is a spring for holding the two plates in position, that is for holding the closure plate against the partition plate. This spring is a coil spring interposed between a spring abutment 12 on the lever arm 5 below the plate 7 and 9, and the closure plate 9. The abutment is held in position by a pin 13 extending through transverse hole in the lever arm 5. The lever arm 5 is formed with flat faces 14 on opposite sides thereof and the hole 10 in the plate 9 is formed with complemental straight sides 15. Owing to the fact that the walls of the housing are tapered the spring thrusts the partition plate 7 in snug engagement with the tapered walls so that no housing need be specially built to have the partition applied thereto. The partition 7 thus forms a seat for the spring pressed closure 9 carried by the lower arm of the gear shifting lever 1, which seat is separable from the housing and is held in position by the spring 5.

This means for preventing the creeping of oil out of the housing 4 is particularly advantageous in that it is self contained with the gear shifting lever and can be readily applied to both the housing and the lever.

What I claim is:

1. The combination of the gear shifting lever of the transmission gearing and the housing in which the lever is pivoted, the lower arm of the lever extending downwardly through the housing and the housing having a transverse partition formed with an opening through which said arm of the lever extends, a sliding closure for the opening in the partition, said closure having an opening substantially fitting the said lever arm, a spring abutment mounted on the lever arm below the closure and a spring interposed between the abutment and the closure.

2. The combination of the gear shifting lever of a transmission gearing and the housing in which the lever is pivoted, the lower arm of the lever extending downwardly through the housing, a plate extending transversely of the housing and fitting the interior wall thereof and forming a transverse partition in the housing, the plate having an opening through which the lever arm extends, a closure plate slidable on the lower surface of the partition plate and having an opening through which the lever arm extends, the arm substantially fitting the opening in the sliding plate, and a spring carried by the lever and thrusting the closure plate against the partition plate and the partition against the wall of the housing.

3. The combination of the gear shifting lever of a transmission gearing and the housing in which the lever is pivoted, the lower arm of the lever extending downwardly through the housing, a plate extended transversely of the housing and fitting the interior wall thereof, and forming a transverse partition in the housing, the plate having an opening through which the lever arm extends, a closure plate slidable on the lower side of the partition plate and having an opening through which the lever arm extends, the arms substantially fitting the opening in the sliding plate, a spring abutment on the lever arm below said plates and a spring interposed between the spring abutment and the closure plate and thrusting the closure plate against the partition plate and the latter in snug engagement with the walls of the housing.

4. The combination of the shifting lever of a transmission gearing and the housing in which the lever is pivoted, the lower arm of the lever extending downwardly through the housing, a separable seat extending transversely of the housing and having an opening through which the lower arm of the lever extends, a spring pressed closure carried by the lower arm of the lever and thrusting against and slidable on the seat and thrusting the seat into snug engagement with the wall of the housing.

In testimony whereof, I have hereunto signed my name at Syracuse, in the county of Onondaga, and in the State of New York, this 21st day of April, 1927.

ERNEST EATON.